United States Patent [19]
Zapata

[11] Patent Number: 5,335,237
[45] Date of Patent: Aug. 2, 1994

[54] PARASITIC OSCILLATION SUPPRESSION IN SOLID STATE LASERS USING ABSORBING THIN FILMS

[75] Inventor: Luis E. Zapata, Livermore, Calif.

[73] Assignee: The United States of America as represented by the United States Department of Energy, Washington, D.C.

[21] Appl. No.: 968,111

[22] Filed: Oct. 29, 1992

[51] Int. Cl.$^5$ .............................................. H01S 3/00
[52] U.S. Cl. ....................................... 372/33; 372/39
[58] Field of Search .................. 372/99, 7, 70, 71, 75, 372/33, 40, 39

[56] References Cited

U.S. PATENT DOCUMENTS

| | | | |
|---|---|---|---|
| 3,383,622 | 5/1986 | Dixon et al. | 331/94.5 |
| 3,445,785 | 5/1964 | Koester et al. | 372/40 |
| 3,484,713 | 12/1969 | Fenner | 331/94.5 |
| 3,579,130 | 5/1971 | Smiley | 330/4.3 |
| 3,599,114 | 8/1971 | Snitzer et al. | 372/40 |
| 3,665,335 | 5/1972 | Tomiyasu | 331/94.5 |
| 3,684,980 | 8/1972 | Kay | 372/75 |
| 3,747,021 | 7/1973 | Smiley | 331/94.5 |
| 3,849,738 | 11/1974 | Hakki | 331/94.5 H |
| 3,906,396 | 9/1975 | Looley | 372/33 |
| 4,150,341 | 4/1979 | Ferguson | 331/94.5 |
| 4,225,826 | 9/1980 | Lewis et al. | 330/4.3 |
| 4,849,036 | 7/1989 | Powell et al. | 156/99 |
| 4,881,233 | 11/1989 | van Arb et al. | 372/35 |
| 4,890,289 | 12/1989 | Basu et al. | 372/33 |
| 4,899,347 | 2/1990 | Kuchar et al. | 372/33 |

OTHER PUBLICATIONS

Guch, S. Jr., "Parasitic suppression in large aperture disk lasers employing liquid edge claddings", *Applied Optics*, vol. 15, No. 6, Jun. 1976, pp. 1453–1457.

Dube, G. et al., "Liquid Cladding for Face-Pumped Nd: Glass Lasers", *Applied Optics*, vol. 13, No. 4, Apr. 1974, pp. 699–700.

McMahon, J. M. et al., "A Glass-Disk-Laser Amplifier", *IEEE J. of Quantum Electronics*, vol. QE-9, No. 10, Oct. 1973, pp. 992–999.

Swain, J. E. et al., "Large-Aperture Glass Disk Laser System", *J. of Applied Physics*, vol. 40, No. 10, Sep. 1969, pp. 3974–3977.

*Primary Examiner*—Rodney B. Bovernick
*Assistant Examiner*—Robert McNutt
*Attorney, Agent, or Firm*—Henry P. Sartorio; Roger S. Gaither; William R. Moser

[57] ABSTRACT

A thin absorbing film is bonded onto at least certain surfaces of a solid state laser gain medium. An absorbing metal-dielectric multilayer film is optimized for a broad range of incidence angles, and is resistant to the corrosive/erosive effects of a coolant such as water, used in the forced convection cooling of the film. Parasitic oscillations hamper the operation of solid state lasers by causing the decay of stored energy to amplified rays trapped within the gain medium by total and partial internal reflections off the gain medium facets. Zigzag lasers intended for high average power operation require the ASE absorber.

15 Claims, 8 Drawing Sheets

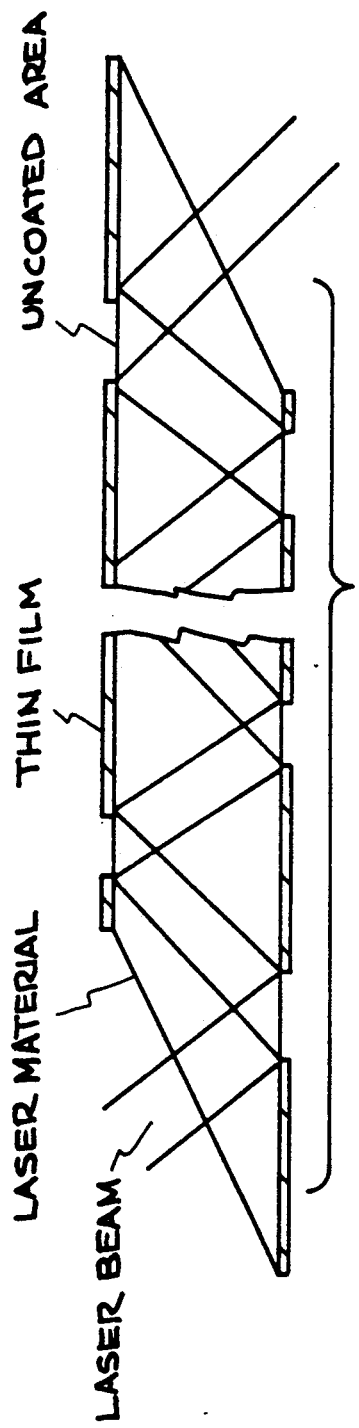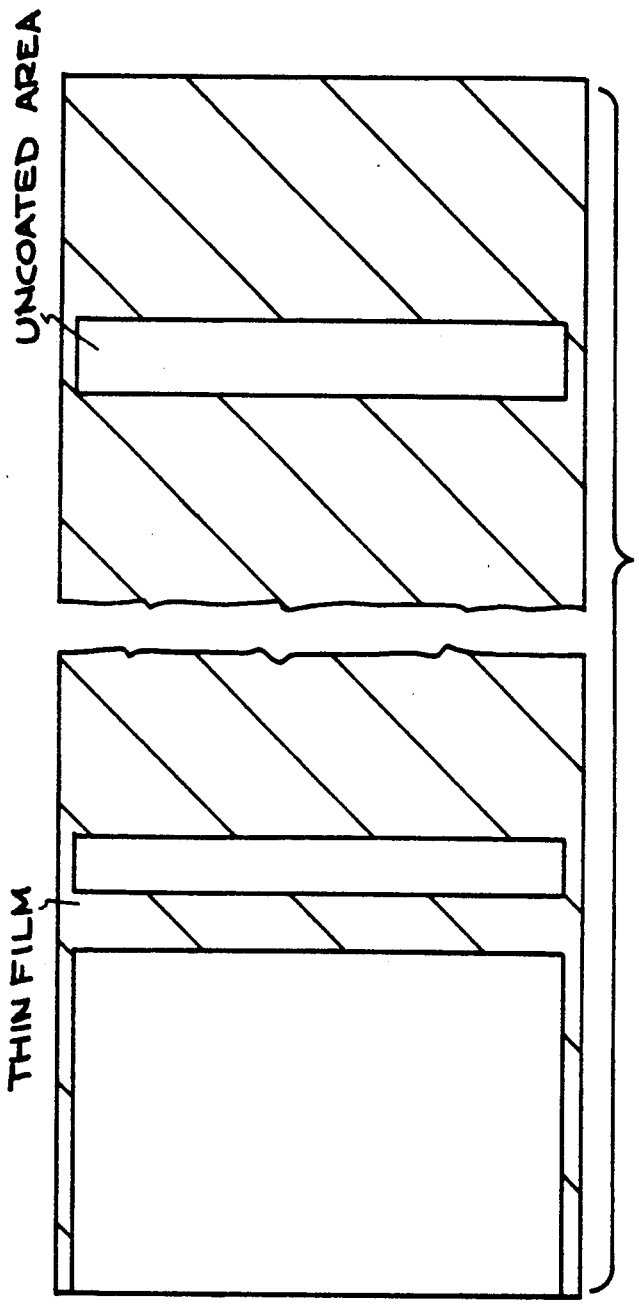
FIG.11A
FIG.11B

PARASITIC OSCILLATION SUPPRESSION IN SOLID STATE LASERS USING ABSORBING THIN FILMS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to an article for reducing or eliminating parasitic oscillation (PL) and amplified spontaneous emission (ASE) in solid state lasers. More specifically, it relates to a thin film attached to strategic facets of a solid state laser gain material to frustrate the total internal reflection of parasitic oscillation and amplified stimulated emission.

2. Description of Related Art

The architecture of most high average power solid state lasers consists of a laser medium interposed between a highly reflecting mirror and an output coupler. Solid state zigzag slab lasers are typically used when high average power is needed because the optical path utilizes more gain medium and tends to average out index of refraction gradients caused by the thermal loading. Diode lasers or flashlamps are often used to optically excite the gain medium. In slab lasers, the medium is optically excited through the two largest exposed planes which are parallel to the optical axis. The laser medium must be cooled due, in part, to the high optical fluxes coupled into the slab by the pumping mechanism. If not properly designed, the stored energy density in slab lasers decreases. This performance reduction is caused by the complementary effects of amplified spontaneous emission (ASE) and parasitic oscillations that occur in the slab laser. [see for example, "Fluorescence Amplification and Parasitic Oscillation Limitations in Disk Lasers", by J. B. Trenholme, NRL Memorandum Rep.2480, July 1972; J. E. Swain et al., *J. Appl. Phys.*, Vol. 40 p.3973, (1969); and J. M. McMahon et al., *IEEE J. Quantum Electron.*, QE-9, p.992, (1973); and U.S. Pat. No. 4,849,036].

Edge claddings are used on solid state laser material to absorb the amplified spontaneous emission and to suppress the onset of parasitic oscillations that would otherwise reduce the stored energy. In general, these claddings consist of a material that is refractive index matched to the laser glass and which contains a dopant that absorbs at the laser (ASE) frequency. A number of different materials have been used for cladding, ranging from sprayed-on glass frits to liquids to castings of monolithic glass. [See, for example, G. Dube and N. L. Boling, *Applied Optics*, Vol. 13, p.699, (1974); G. Guch, Jr.,*Applied Optics*, Vol. 15, p.1453, (1976); and D. Milam et al., "Platinum Particles in the Nd:doped Disks of Phosphate Glass in the Nova Laser", Laser Induced Damage in Optical Materials 1985: Proceedings of the Boulder Damage Symposium, Boulder, Colo., November 1985] In the 100-kJ Nova pulsed laser system at Lawrence Livermore National Laboratory, claddings of monolithic glass doped with ionic copper that absorbs at 1 micrometer have been used. Although the performance of this latter cladding works well in high peak power lasers, the heat transfer properties are not adequate for use in high average power solid state lasers.

Parasitic lasing (PL) severely limits the performance of high gain solid state zigzag slab lasers by depleting energy in the upper laser level. The problem is enhanced because solid state laser materials have a higher index of refraction than the surrounding media. The traditional method for suppressing ASE and PL, as stated supra, has been to bind a relatively thick layer of weakly absorbing material with closely matched index of refraction to the edges. Index matching suppresses the reflection of light rays at the boundary between the two media, enabling the absorption of radiation within the bonding material. These traditional edge absorbers for ASE and PL suppression work adequately for high peak power, low average power lasers, but, due to unacceptable heat transfer properties, are not suitable for high average power lasers.

It is desirable to have a thin film attached onto the otherwise reflective surfaces of a solid state laser medium to bring about suppression of total internal reflections and reduction in the internal reflectivity for wide angular incidence without use of the doped index matching material. The present invention provides such an article.

SUMMARY OF THE INVENTION

It is an object of this invention to provide a suppresser of ASE and PL within the gain medium of high average power solid state lasers as well as within the gain medium of high peak power low repetition rate lasers.

The present invention relates to an article for suppressing parasitic oscillations in a high average power solid state laser by combining an integral solid state slab laser gain medium with a thin film of higher index of refraction such that total internal reflections of parasitic oscillations are frustrated within the gain medium. The preferred embodiment of this invention is an edge cladding which suppresses ASE and PL and is formed of an absorbing metal(or semiconductor)-dielectric multilayer-layer coating optimized for a broad range of incidence angles and resistant to the corrosive effects of a coolant such as water which is used in the forced convection cooling of the coating.

BRIEF DESCRIPTION OF THE DRAWINGS

FIGS. 11a and 11b show a thin film applied to all laser medium surfaces, other than the entrance and exit faces, which do not reflect the laser beam.

DETAILED DESCRIPTION OF THE INVENTION

Definitions

As used herein:

"High average power" refers to any solid state laser with an output power of 50 watts or greater.

"Solid state laser gain medium" refers to material useful for the storage of optical energy.

"Thin film" or "coating" refers to a combination of materials which have indices of refraction which are greater than the index of the solid state laser gain medium. Preferred materials include germanium, silicon, gold, silver, silica, diamond, graphite, dried graphite ink, and some semiconductors and halides.

The present invention is directed to reducing or eliminating parasitic oscillation and amplified stimulated emission in solid state lasers and related gain materials by binding an absorbing thin film onto the gain medium wherein the index of refraction of the film is greater than or equal to the index of refraction of the gain material.

Figure 1A:
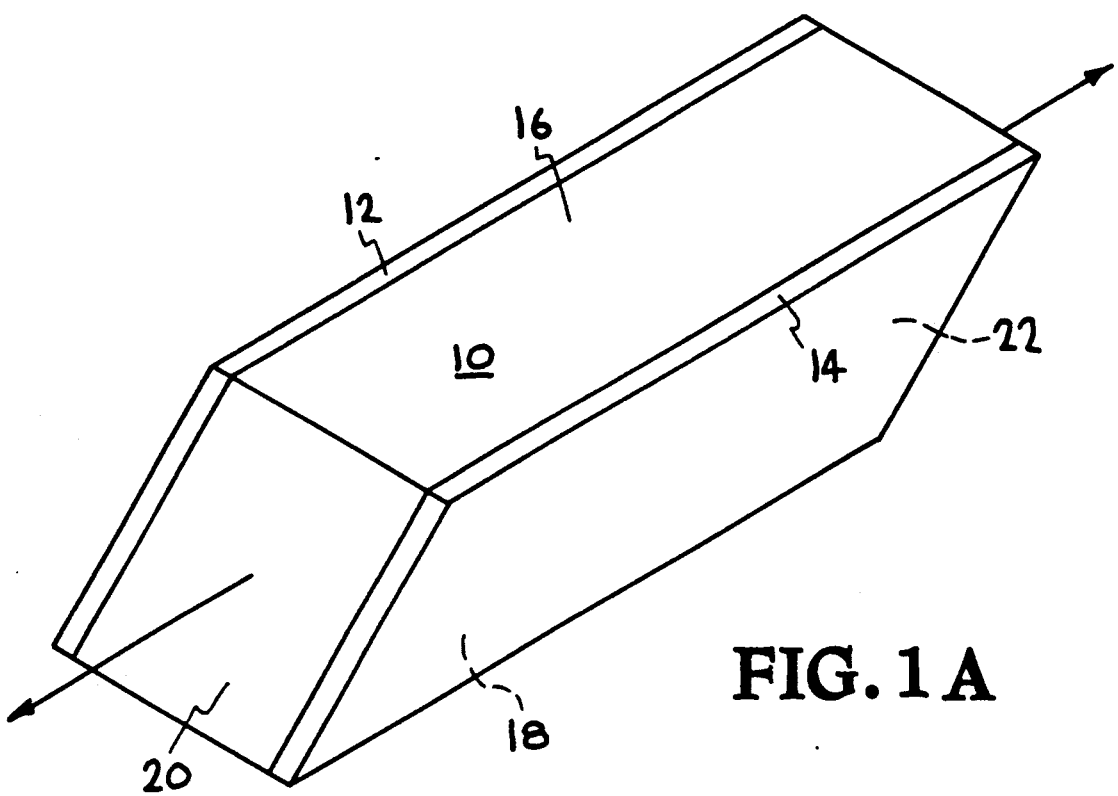
FIG. 1a shows the preferred embodiment of the invention.
Figure 1B:
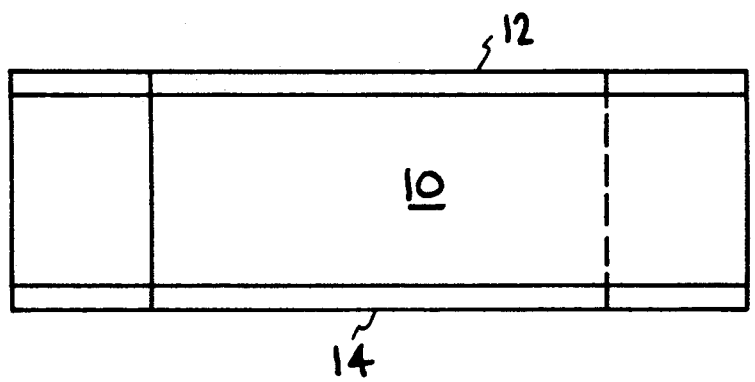
FIGS. 1b, 1c, and 1d show the top, side, and end views respectively.
Figure 1C:
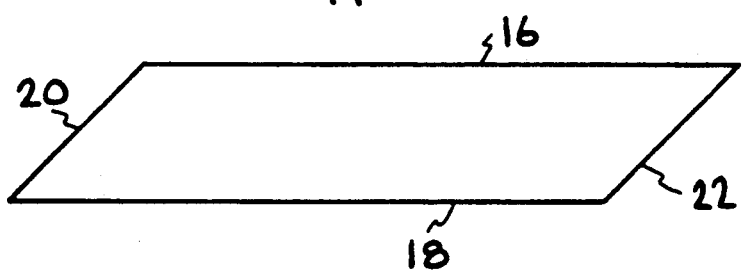
Figure 1D:
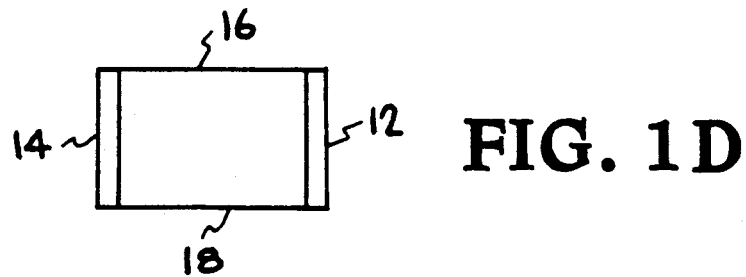

A preferred embodiment of the present invention includes a solid state laser gain medium 10, of slab design, in combination with thin films 12 and 14 of effectively greater than or equal index of refraction than medium 10 (FIGS. 1a and 1b). For operation, the film does not have to be placed on all surfaces, but can be placed on all surfaces where the laser beam does not impinge. Upper pump face 16 and lower pump face 18 are parallel one to another and are substantially parallel to the optical path (as indicated by an arrow). The gain medium 10 has entrance face 20 and exit face 22 cut at Brewster's angle with respect to pump face 16 and pump face 18 (FIGS. 1c and 1d). An input beam is input through entrance face 20 and traverses a zigzag path through medium 10, making many reflections off faces 16 and 18 until the beam exits through exit face 22. The beam is amplified during passage through gain medium 10. Other shapes of the gain medium are possible which also store energy. Additional parameters and requirements are described herein below.

Amplified Spontaneous Emission (ASE)

The effects of ASE and parasitic oscillations on energy storage in solid state lasers has been examined. A brief physical explanation is provided of the process as it relates to the thin film development.

During optical pumping, some of the excited atoms spontaneously decay, emitting photons at the frequency of the laser transition. These photons will subsequently be amplified as they travel through the laser gain medium. The signal gain (G) is given by:

$$G = I/I_0 = \exp(\alpha \cdot L)$$

where Io (watts) is the initial intensity and I(watts) is the intensity after traveling a distance L (cm) through a medium having a positive gain coefficient, $\alpha$ (cm$^{-1}$).

Figure 3:
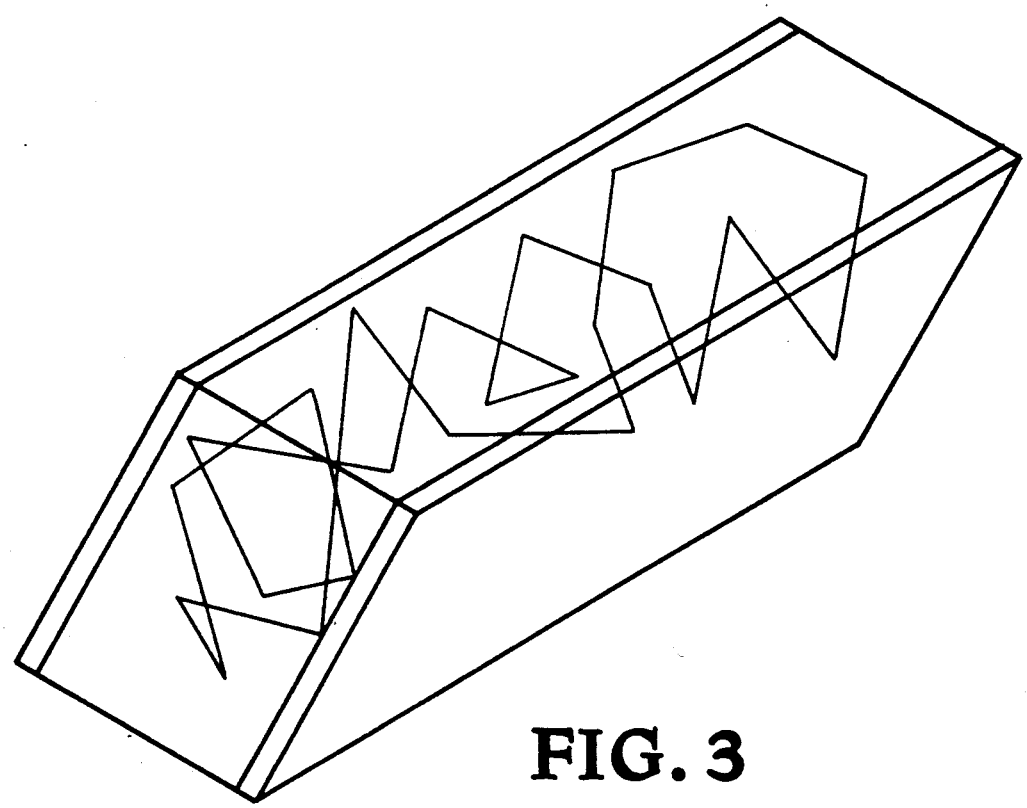
FIG. 3 illustrates 3-dimensional parasitic oscillations.

The critical angle for the boundary separating two optical media is defined as the smallest angle of incidence, in the medium of greater index of refraction, for which light is totally reflected. At angles greater than or equal to the critical angle, TIR occurs. In a slab configuration laser, most of the decay photons are emitted at angles greater than the critical angle for total internal reflection (TIR). Thus, these photons become "trapped" between the slab faces and travel through the slab by TIR until reaching the edge (FIG. 3). Upon reaching the slab edge, the ASE can be totally or partially reflected back into the slab. If the gain in traversing the slab exceeds the edge reflection losses then the process can proceed indefinitely. This effect is referred to as parasitic oscillation. In other words, parasitic oscillations are suppressed as long as R×G<1, where R is the reflectivity from the edge and G is the gain as described above.

Single Layer Absorbing Film Reflectivity

Figure 2:
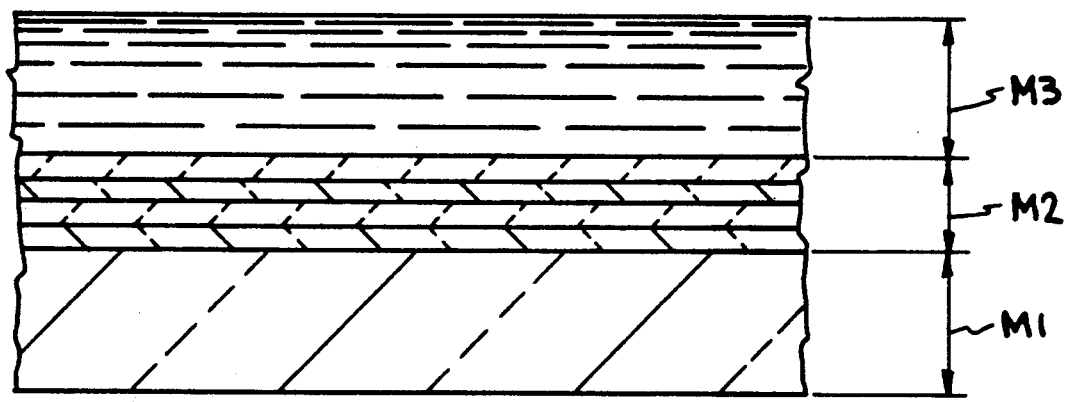
FIG. 2 shows the geometry of a multilayer absorbing film on a transparent substrate.

The geometry of the absorbing edge cladding of a preferred embodiment is defined in FIG. 2. The laser material of medium 1 (M1) is a suitable gain medium such as Neodymium: Gadolinium Gallium Garnet (Nd:GGG). Medium 2 (M2) is a multilayer metal-dielectric absorbing coating, e.g., alternating layers of germanium and diamond. Medium 3 (M3) is a coolant such as water. Spontaneous emission or parasitic lasing within medium 1 radiates in random directions causing depopulation of upper laser levels. Some of these random rays impinge upon the interface of medium 1 and pass into medium 2 where they are absorbed. Medium 2 is absorbing for a wide range of angular incidence and, ideally, reflectivity is brought down to zero at all angles of incidence.

Figure 4:
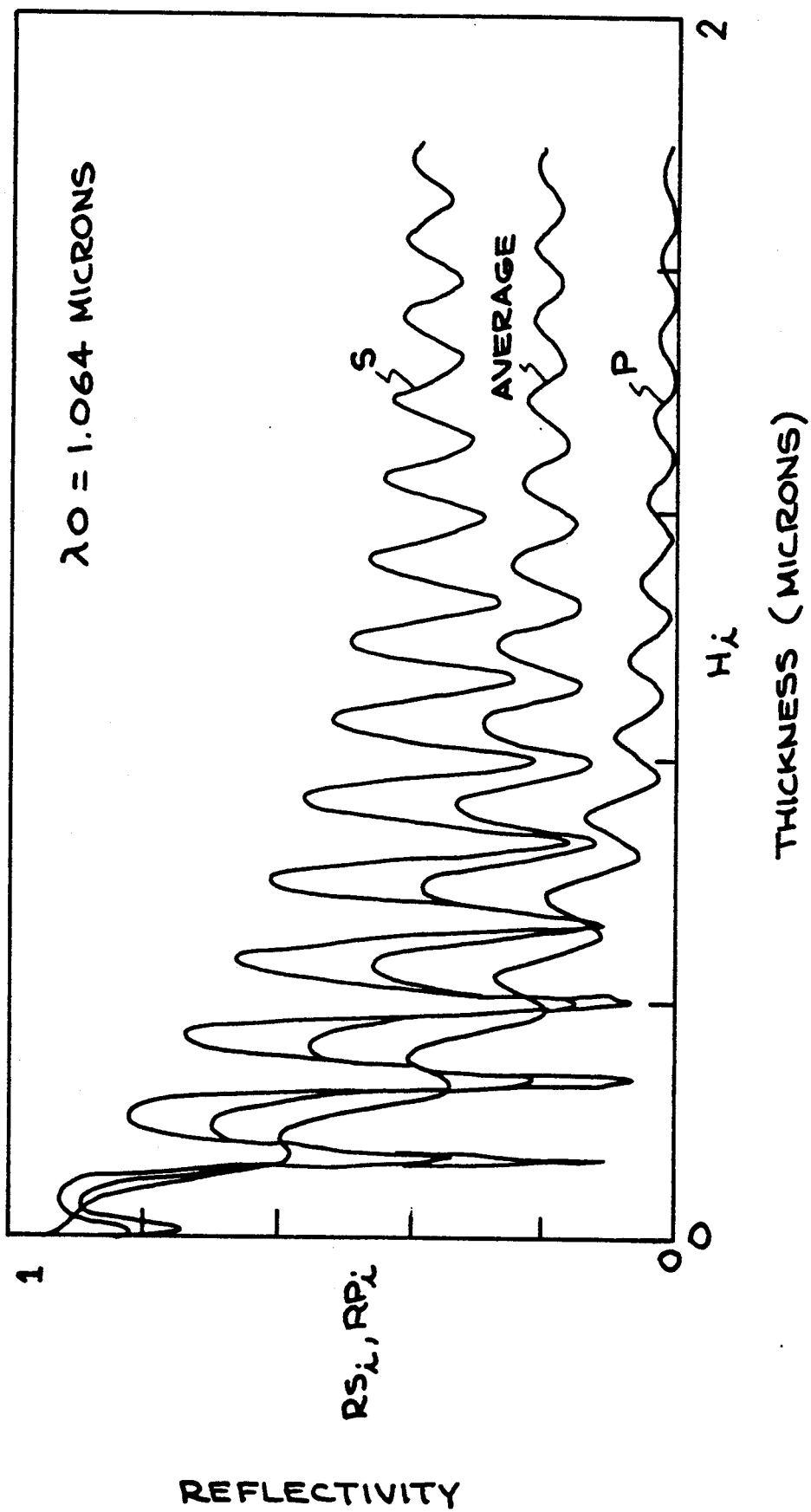
FIG. 4 shows reflectivity of a Ge film as a function of thickness.
Figure 5:
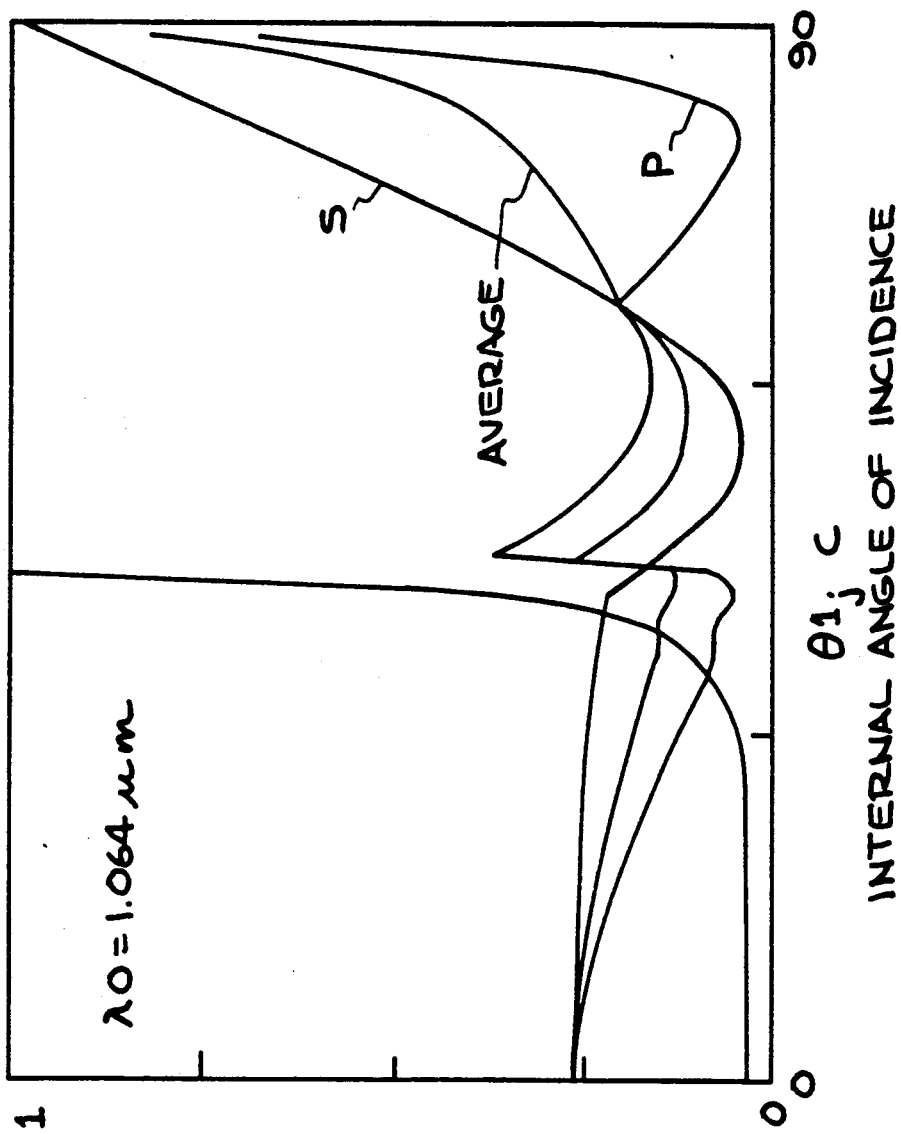
FIG. 5 shows reflectivity as a function of the internal angle of incidence for a 0.4 micrometer germanium film.
Figure 6:
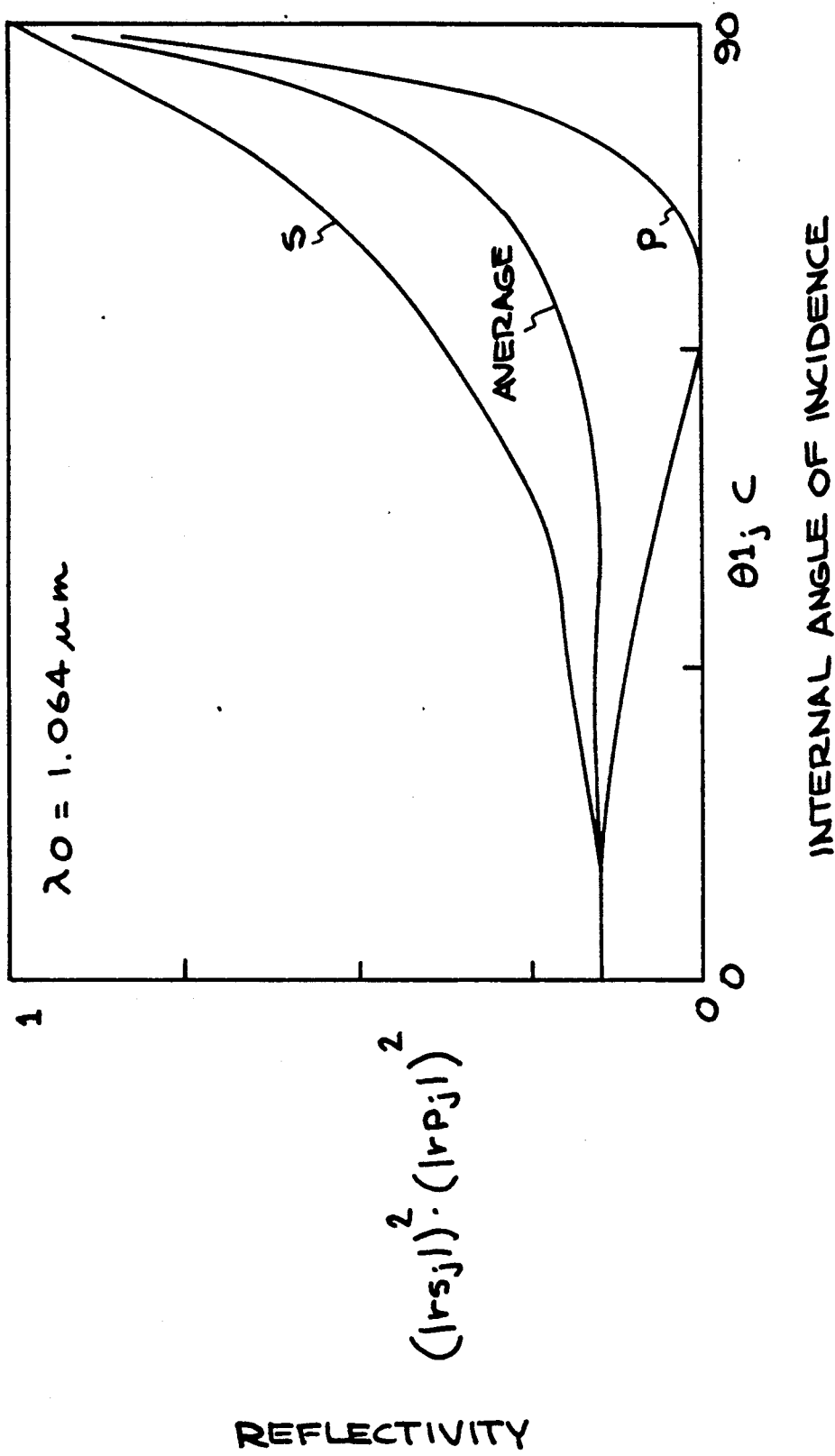
FIG. 6 shows the reflectivity as a function of the internal angle of incidence for a 1.9 micrometer germanium film.

FIG. 4 shows reflectivity as a function of film thickness (at 60° incidence) for a germanium film. There are several minima and maxima for both polarizations spaced roughly ¼ wavelength apart. Because germanium is absorbing, interference effects become negligible as the film thickness increases. The Ge thickness that minimizes the reflectivity for the widest angular coverage possible (as judged by the sum of squares) is found at 400 nm run which is the fourth minimum on FIG. 4. The resulting reflectivity as a function of angle for this film thickness is shown in FIG. 5. The reflectivity for the uncoated interface is also shown in this figure. FIG. 5 shows that the TIR angle of 43 degrees is effectively "frustrated" by the Ge film. What can be done with a single film of germanium is limited. A multilayer coating based on alternating layers of germanium and silica or diamond, for example, would enhance the properties of the single film in FIG. 5 markedly. A simpler alternative is to utilize a Ge "thick" film. A monolithic layer of 1.9 micrometers thickness has the reflectivity shown if FIG. 6.

ASE Flux (Heat Source) at the Edges

One of the advantages of this approach is that the absorbing films are very thin (about 1 micron) which makes it relatively easy to conduct heat out into a suitable coolant. In order to analyze the heat transfer, the heat source power must be obtained.

To obtain an estimate of the ASE reaching the edges, an infinitesimal area element on the center of the edge surface looking into the slab was considered. Due to total internal reflection, this elemental area "sees" images of a small volume of the slab from several discrete angles greater than the TIR angle relative to the pump face. For isotropic emission, the power radiated by a volume element $\Delta V$ is given by $$P_v = \left(\frac{\rho f}{4\pi \tau}\right)\Delta V$$

where $\rho$ is the upper level energy density, f is the quantum ratio for the laser transition, and $\tau$ is the lifetime of the upper state. The emission is considered to be at line center and the peak cross section is used, resulting in an overestimate. The incident power on a point on the edge is then $$dH\lambda = \left(\frac{P_v}{L^2}\right)e^{aL}\cos\psi$$

where l is the distance from the emitting volume (actual or imaged) to the point on the edge, $\Psi$ is the angle between the edge normal and the ray direction, and $$a = \frac{\sigma P_v}{hc/\lambda} - \beta$$

is the gain coefficient at line center where, $\sigma$ is the peak stimulated emission cross section and $\beta$ is the intrinsic loss term in the material due to absorption and scattering. The estimate can be obtained as a function of pumping intensity if the material constants are known and, the relationship between pump input power and upper level circulating power is known, i.e., the gain as a function of lamp input power.

Figure 7:
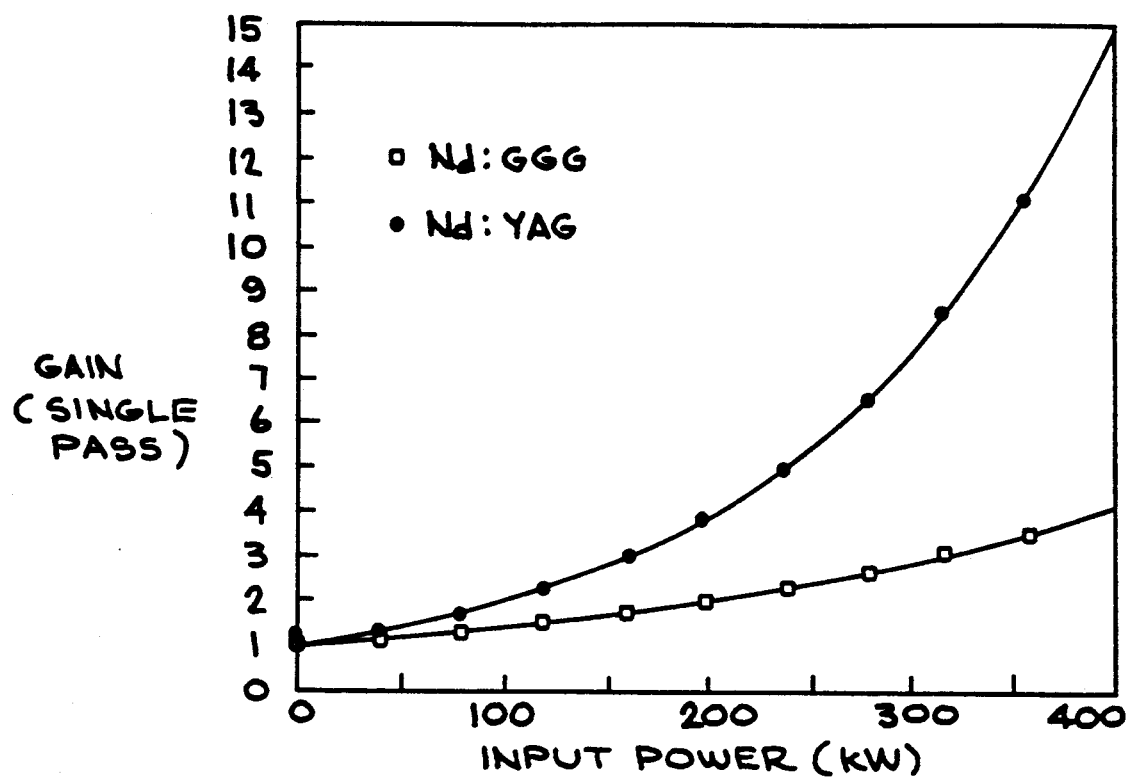
FIG. 7 shows single pass gain vs. arc lamp input power.
Figure 8:
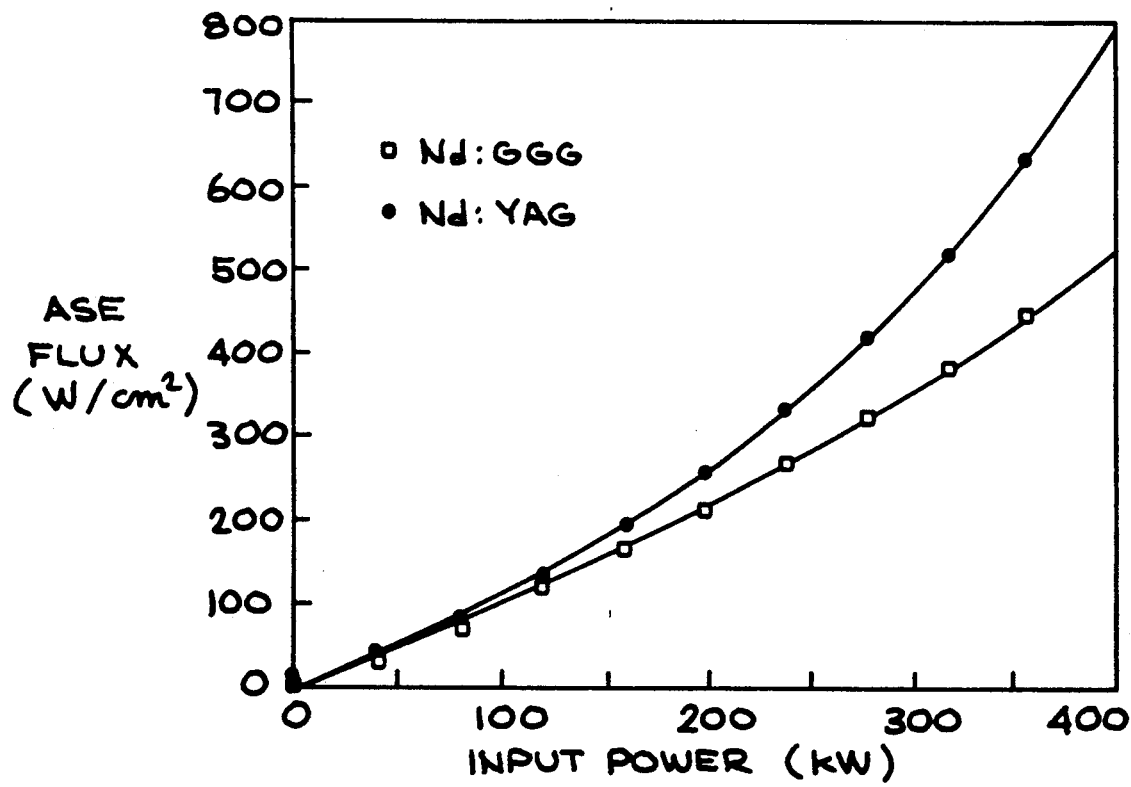
FIG. 8 shows ASE flux vs. arc lamp input power.

The absorption spectrum of Nd:YAG (0.5 cm thickness) was convolved with the high resolution spectrum of an argon filled arc lamp operated at 114 kW. The result was that the arc lamp would input about 7.5 kW into the upper laser level (neglecting transport losses). The pump limit due to material strength issues for a $18 \times 7 \times 0.5$ cm$^3$ Nd:GGG slab was estimated to be around 100 kW. Using the activation efficiency as a baseline and neglecting changes in spectral content as the lamp power is varied, FIGS. 7 and 8 were generated. FIG. 7 shows the single pass gain and FIG. 8 shows the ASE flux incident on the central point on the edge, as a function of input power to the arc lamp for Nd:YAG ($\sigma=2.4\times10^{-19}$, $\beta=0.001$ cm$^{-1}$), and Nd:GGG ($\sigma=1.3\times10^{-19}$, $\beta=0.003$ cm$^{-1}$). If the Nd:GGG were able to operate at the stress limit, i.e., arc lamp power of 100 kW, then the coating will have to resist about 100 Watts/cm$^2$ of ASE flux. FIGS. 7 and 8 go past this input power limit for the arc lamp in order to show the expected instantaneous ASE edge flux were the arc lamp pulsed. Depending on the final modulator design for a pulsed crystal amplifier, a flux of 500 W/cm$^2$ was estimated at the peak of 200 microsecond pulses fired at a repetition rate of 2000 pps.

Heat Transfer

The time dependent, heat transfer analysis can proceed from solutions to the equation $$\nabla^2 T + \frac{Q}{k} = \frac{1}{a}\frac{dT}{dt}$$

with the appropriate boundary conditions. Here T is the temperature, Q the volumetric heat source, k is the thermal conductivity, $a=k/\rho c$: the thermal diffusivity where $\rho$ is the density and c is the heat capacity, and t is time.

Figure 9A:
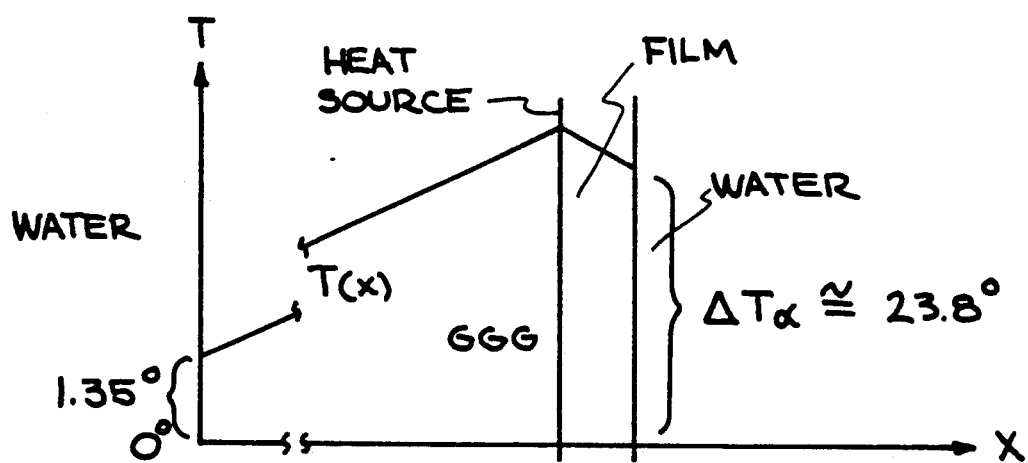
FIG. 9a shows the heat transfer characteristics at steady state for a surface heat source at the Nd:GGG film interface.
Figure 9B:
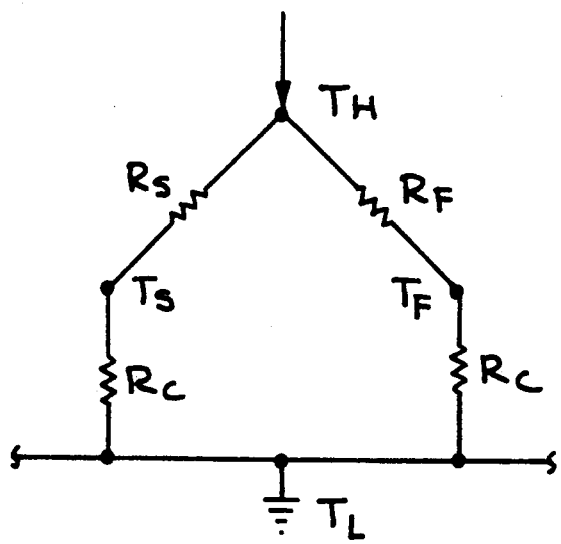
FIG. 9b shows the equivalent electrical circuit for the Nd:GGG film interface heat transfer characteristics.

The diagram shown in FIG. 9(a) depicts the solution for the one-dimensional problem. The steady state solution is found with the aid of the equivalent electrical circuit shown in FIG. 9(b) where the conductive resistances per unit area A across a length $\Delta x$ are calculated as $$\frac{\Delta x}{kA}$$

and the convective resistance as $$\frac{1}{HA}$$

where H is the convection transfer coefficient (H=4 W/cm$^2$/° C. for the following results). It is a straightforward task to calculate the linear temperature distribution. The resulting temperature drop across a 2 micron thick absorbing film with thermal constants equal to Nd:GGG (such as would exist if an absorbing ion were diffused or bombarded on the edge) is calculated to be 0.315° C. For a germanium film of the same thickness, this temperature drop is 0.032° C. With either film, the heat flow into the water separates with 94.6 W/cm$^2$ flowing through the film and 5.4 W/cm$^2$ through the Nd:GGG. With either film, the temperature drop (to within 0.02° C.) between the film surface and the bulk water temperature is 23.68° C., and between the Nd:GGG and bulk water temperature is 1.35° C.

Unless the laser is operated continuous wave (cw), (in which case the gain is not high enough to expect parasitics), temperature cycling of the coating is inevitable. Whether the lamp is cw or pulsed, pulsed extraction will rapidly deplete the population of excited states and thus the fluorescence. The time dependent solution is required. The numerical solution to this problem was calculated with the assumption that the above steady state solution is applied as the initial temperature distribution at t=0. The input pulse was modeled with the analytical function $$f(t) = F\left(\frac{t}{\tau_o}\right)\exp\left(1 - \frac{t}{\tau_o}\right)$$

where t is time, $\tau_o$ is a characteristic time constant and F is the peak flux obtained when $t=_o$. For this analysis, $\tau_o=40$ microseconds was used (giving a pulse width of 200 microseconds) and a peak power of F=500 W/cm$^2$. This results in an integrated pulse energy of 0.054 J/cm$^2$ which works out to a repetition rate of 1839 pps in order to produce the average 100 W/cm$^2$. The convective heat transfer coefficient H depends on the fluid velocity, boundary layer thickness, fluid properties, etc. The value of H is design dependent. A first order number for turbulent water flow with a Reynolds number above 10,000 at 4 W/cm$^2$/° C. was achieved. Numerical solutions were obtained for a Nd:GGG-like film and for a germanium film respectively. In both cases, the film was two microns thick and the temperature profiles were sampled after a few pulses had arrived. The instantaneous temperature profiles were separated by 15 microseconds. The maximum temperature drop across the film was 0.403° C. for the Nd:GGG-like film and 0.042°

C. for the germanium film. Temperature fluctuations penetrated approximately 50 microns into the Nd:GGG material.

Highly turbulent water flow is not the only effective method to remove the heat from the backside of the film. If the average power is low (e.g. 10 W/cm$^2$), a cooled metal backing could be sufficient or at high average powers a microchannel plate (such as used in cooling high power diode arrays) can be used. Another alternative is in phase change heat pipe designs.

Experimental Results

Several Nd:GGG prisms with angles of 56 degrees and 84 degrees were coated with germanium. The internal reflectivity was measured at approximately 9 degree intervals and found to match calculations with some deviations deemed to be due to the inaccuracy of the available (complex) refractive index data for germanium (which varies by factors of 3 or more in the literature). A 56 degree prism was coated with a two micron film of germanium and mounted on hardware designed to provide 5 gpm water flow at a Reynolds number greater than 10,000 on the back of the absorbing film. After hydrodynamic testing for a total of 40 minutes, the prism was then irradiated with a cw welding laser at 442 watts for 11 minutes. No visible signs of erosion were evident. An uncoated, identical prism was used for control to appropriately correct for Fresnel losses. Independent measurements of transmitted power and water temperature rise with uncoated and coated prisms agreed within 10% and showed that the coating must have absorbed 126 of 160 W/cm$^2$ incident on it at a 56 degree internal angle.

Figure 10:
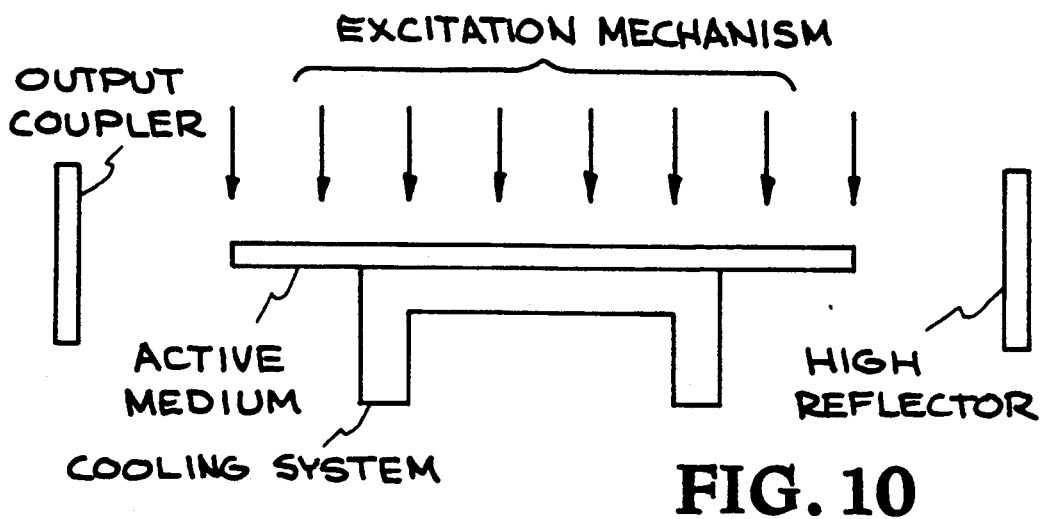
FIG. 10 shows a side view of a slab laser.

Other candidate thin films that suppress parasitic oscillations are, for example, silicon, lead selenide, lead sulfide, lead telluride, gallium arsenide, selenium, tellurium, aluminum antimonide, and indium phosphide. The foregoing are all semiconductors with appropriate bandgaps to effect absorption in the visible and near infrared so that if they were deposited as thin films by standard implantation on strategic surfaces of gain mediums such as Nd doped crystals they would effectively suppress the ASE and increase the operating gain of the device FIG. 10 shows a solid state laser with an active medium which could have a rod or slab configuration. The rod design can have the absorbing film on all surfaces of the medium except for the beam entrance and exit faces. FIGS. 11a and 11b show a slab laser with a thin film bonded onto all areas where the laser beam does not impinge. In the configurations shown in FIGS. 10, 11a, and 11b, the thin film is selected to allow transmission of the light from the excitation mechanism.

Usable thin films are not restricted to semiconductors. Other compounds can be utilized, for example rubidium iodide, potassium iodide, thallium chloride, thallium bromide, and silver chloride. These and others have appropriate absorption coefficients at wavelengths of interest. Possibilities exist also with metal films (gold, silver if they are thin: tens of angstroms) multilayer-layered with dielectrics (nonconductors of electricity).

Diamond films can be used. The index of refraction of dense diamond films is 2.4. This is close to the right index to build an anti-reflection coating between YAG and germanium, further lowering the reflectivity of a germanium "thick" film (~2 micrometers thick). Alternatively, a diamond/germanium multilayer film can be optimized for 1.06 and 1.33 micrometer emissions or other wavelengths appropriate to the solid state laser in question. A monolithic layer of an appropriate film material with a thickness of odd multiples of a ¼ wavelength of the incident parasitic lasing and amplified stimulated emission can be optimized for many solid state lasing materials. By setting each layer of a multilayer film to be ¼ of the PL and ASE wavelength, improved reductions in reflectivity occur. Diamond/graphite films are appropriate if the carbon content is adjusted to the index of refraction of the laser host material.

Ion implantation or diffusion of yttrium in neodymium doped crystals would affect the same suppression because yttrium absorbs the neodymium fluorescence. Similarly, dysprosium and samarium have absorption bands in the near infrared and could be deposited on the edges of neodymium, erbium, or holmium doped laser materials.

The techniques for applying these films vary, and are known in the prior art. Many adhesion and mechanical properties for these films are a function of the particular growth parameters and need to be perfected by trial and error. This procedure is however considered to be an integral part of the state of the art in thin film growth, especially in multilayer structures.

Heat transfer can be successful in removing the high fluxes due to ASE (thus limiting further ASE growth) only if the films are absorbing at the wavelength and appropriately thin such that their thermal resistance is low enough to keep them from fracturing and or delaminating. These conditions have been successfully demonstrated at levels reaching 160 W/cm$^2$ continuous, and 12 kW/cm$^2$ peak. From theoretical solutions, films able to withstand 500 W/cm$^2$ average and 20 kW/cm$^2$ peak are predictable.

Changes and modifications in the specifically described embodiments can be carried out without departing from the scope of the invention, which is intended to be limited by the scope of the appended claims.

I claim:
1. A material comprising:
    (a) a solid state laser gain medium; and
    (b) an absorbing thin film bonded to at least certain surfaces of said gain medium wherein the index of refraction of said thin film is greater than or equal to the index of refraction of said gain medium and wherein said thin film is selected from a group consisting of germanium, silica, dried graphite ink, semiconductor material, a halide and dysprosium.
2. A material as recited in claim 1, wherein said gain medium is designed to operate at high average power.
3. A material as recited in claim 1, wherein said film is resistant to the corrosive effects of a coolant.
4. A material as recited in claim 3, wherein said film has an absorption coefficient that is low enough to prevent reflection of the amplified stimulated emission and parasitic lasing.
5. A material as recited in claim 4, wherein said film is cooled by a cooling system selected from a group consisting of forced convection cooling, water, a microchannel cooling plate, and a heat pipe design.
6. A material as recited in claim 5, wherein said germanium film has a thickness of 0.4 micrometers.
7. A material as recited in claim 5, wherein said germanium film is a monolithic layer of 1.9 micrometers.
8. A material as recited in claim 5, wherein said film has a thickness of odd multiples of a ¼ wavelength of the incident parasitic lasing and amplified stimulated emission.

9. A material as recited in claim 5, wherein said film is comprised of multiple layers.

10. A material as recited in claim 9, wherein each layer of said multiple layers have a thickness of odd multiples of a ¼ wavelength of the incident parasitic lasing and amplified stimulated emission.

11. A material as recited in claim 10, wherein said film has alternating metal-dielectric layers.

12. A material as recited in claim 11, wherein said film is comprised of alternating layers of germanium and silica.

13. A material as recited in claim 1, wherein said semiconductor material is selected from a group consisting of lead selenide, lead sulfide, lead telluride, gallium arsenide, selenium, and tellurium.

14. A material as recited in claim 1, wherein said halide is selected from a group consisting of rubidium iodide, potassium iodide, thallium chloride, thallium bromide, and silver chloride.

15. In a laser having a solid state gain medium, the improvement comprising: an absorbing thin film bonded onto at least certain surfaces of said gain medium where a laser beam does not impinge, wherein said thin film is selected to allow transmission of light from an excitation mechanism, wherein said thin film is selected from a group consisting of germanium, silica, dried graphite ink, semiconductor material, a halide and dysprosium, wherein the index of refraction of said thin film is greater than or equal to the index of refraction of said gain medium and wherein the thin film is positioned to frustrate total internal reflection of amplified stimulated emission and parasitic lasing without substantially suppressing a laser beam propagating through the gain medium.

* * * * *